United States Patent
Archidoit

[15] 3,648,751
[45] Mar. 14, 1972

[54] DEVICE FOR UNSEATING TIRE BEADS FROM WHEEL RIMS

[72] Inventor: Jacques Archidoit, La Celle Saint Cloud, France

[73] Assignee: Dunlop Holdings Limited, London, England

[22] Filed: Mar. 17, 1970

[21] Appl. No.: 20,246

[30] Foreign Application Priority Data
   Mar. 25, 1969   France ................................. 6908725

[52] U.S. Cl. ................................................. 157/1.17
[51] Int. Cl. ................................................. B60c 25/00
[58] Field of Search .................... 157/1.1, 1.17, 1.2, 1.26, 1.3

[56] References Cited
UNITED STATES PATENTS

| 1,452,596 | 4/1923 | de Fernelmont | 157/1.17 |
| 1,475,519 | 11/1923 | Snider | 157/1.17 |
| 2,581,086 | 1/1952 | Edenfield et al. | 157/1.17 |
| 2,900,016 | 8/1959 | Woodward | 157/1.17 |
| 2,901,029 | 8/1959 | Mraz | 157/1.17 |

Primary Examiner—Granville Y. Custer, Jr.
Attorney—Stevens, Davis, Miller & Mosher

[57] ABSTRACT

A device for unseating a tire bead from a wheel rim comprising a jack mounted on a clamp for gripping the wheel rim, the mounting of the jack on the clamp being arranged to transmit the reaction force from the jack to the clamp to tighten the grip of the clamp on the rim.

8 Claims, 3 Drawing Figures

DEVICE FOR UNSEATING TIRE BEADS FROM WHEEL RIMS

This invention relates to a device for unseating a tire bead from a wheel rim.

In removing a tire from a rim on which it has been mounted it is necessary to detach the tire beads from their seats along the edges of the rim. This operation requires considerable force particularly when the tire is of large dimensions or has not been removed from the rim for a long time.

Devices for unseating a tire bead from a wheel rim have previously been proposed which comprise a clamp which grips the edges of the rim and a jack mounted on the clamp, the jack being provided with a tool in the form of a scoop to engage the tire and push it back from the edge of the rim.

The previously known devices have the disadvantage that it is difficult to fix the clamp to the rim firmly enough for it to support the jack against the intense forces necessary during the unseating operation.

According to the present invention a device for unseating a tire bead from a wheel rim comprises a clamp for gripping the edge of the wheel rim and, mounted on the clamp, a jack carrying a tool for bearing on the tire. The clamp, including a pair of levers and the jack, are mounted on the clamp on a mounting means which is operably connected to at least one of the levers. When the jack is operated to unseat a tire bead a reaction from the jack is transferred through the mounting means to the levers, to tighten the grip of the clamp on the wheel rim.

Thus in use of the device of this invention, the more the resistance experienced by the tool of the jack, the greater is the reaction transferred to the levers, and the tighter is the grip exerted by the clamp. The danger of the clamp slipping from the wheel rim is thus greatly reduced.

A device constructed and arranged in accordance with the invention will now be described, by way of example only, with reference to the accompanying drawings in which.

Figure 1:
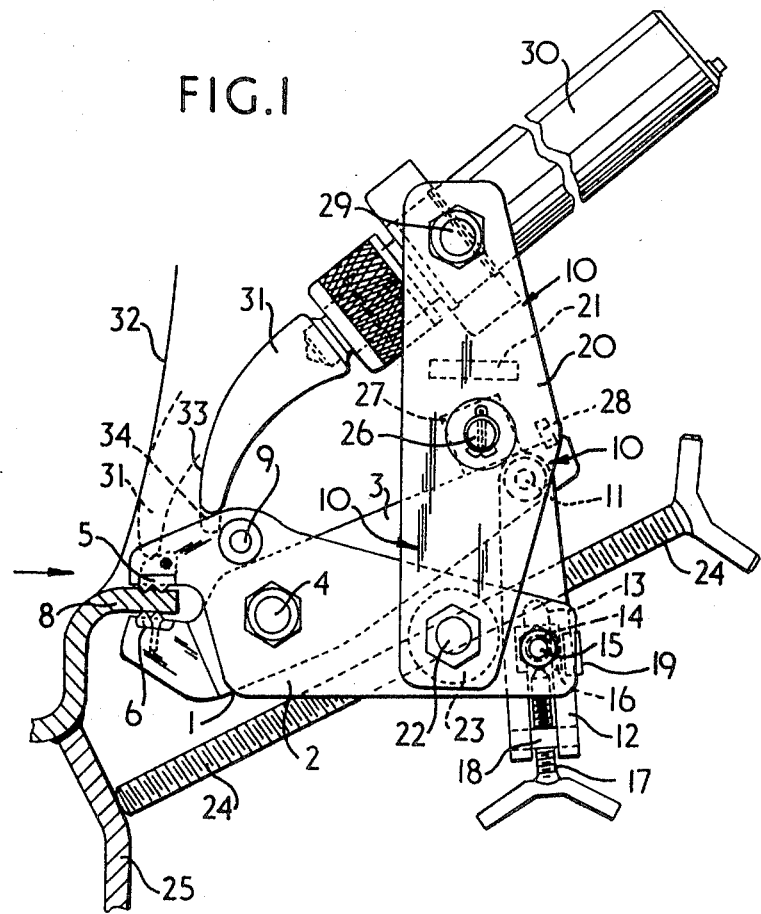
FIG. 1 is a side elevation view showing the device mounted on the rim of a wheel.

As shown in FIG. 1 the device comprises a clamp 1 formed of two robust levers 2 and 3 pivoted together on an axle 4, a jack 30 carrying a tool 31 for bearing on a tire and a mounting means 10 for the jack.

Figure 2:
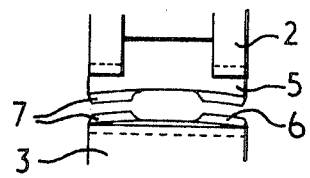
FIG. 2 is a partial front view of the jaws of the clamp.

The clamp has a pair of jaws 5 and 6 which are removable and of special steel, and have teeth 7 whose edges, situated in planes perpendicular to the median plane of the clamp, are inclined slightly, as shown in FIG. 2, to make allowance for the curvature of the edge of the wheel rim 8 on which the clamp 1 must be closed, as represented on FIG. 1.

The lever 2 of the clamp is double and has two arms (see FIG. 3) situated on either side of the arm of the lever 3.

A cross-piece 9 mounted between the arms of the lever 2 prevents the said arms from opening.

At the end of the lever 3, on an axle 11, a double slide 12 is articulated passing between the ends of the arms of the lever 2. The slide 12 has longitudinal slots 13 in which are engaged bearings 14 of an axle 15 fixed to the arms of the lever 2. The axle 15 carries a support block 16 on which bears the end of a longitudinal screw 17, screwed in a transverse nut 18 which is attached to the free end of the slide.

A cross-piece 19 connects the two sides of the slide and also prevents the block 16 from turning.

The mounting 10 for the jack 30 is made up of two side-pieces 20 interconnected by a cross-piece 21, the side-pieces 20 being positioned outside the lever 2, one on each side of the lever 2.

The mounting 10 thus constituted is pivotally connected to the lever 2 on an axle 22 which has at its central part, between the arms of the lever 2, a sleeve 23 pierced with a diametrical, tapped hole into which is screwed a threaded crutch member 24 designed to bear on the body 25 of the wheel to brace the lever 2 against the wheel.

Figure 3:
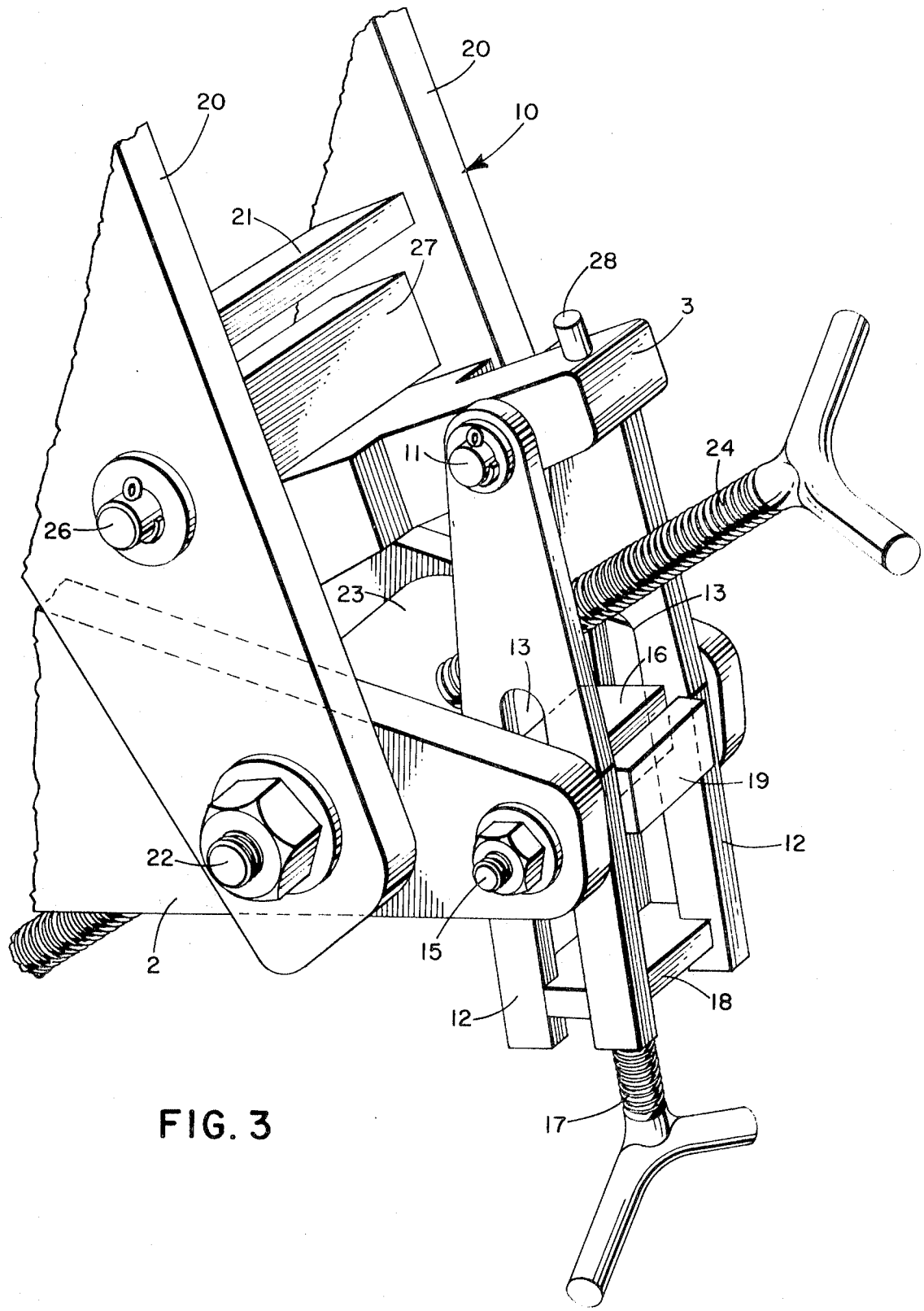
FIG. 3 is a perspective view showing the clamping screw.

Approximately in their middle of side-pieces 20 is a transverse axle 26 on which is loosely mounted a block 27 which engages and bears on the outer face of the lever 3, as is shown in FIGS. 1 and 3. The lever 3 carries a stop 28 designed to limit the latitude of displacement of the block 27 along the lever 3 and hence of the whole mounting 10.

Between the ends of the side-pieces 20 is pivotably mounted, on an axle 29, a hydraulic jack 30 whose shaft terminates in a tool 31 in the form of a scoop, curved inwards towards the clamp 1 in such a manner as to extend towards a tire 32 a wide bearing face 33.

The end of the tool 31 has a flat indentation 34 of the same width as the end of the lever 2 next to the tire, to allow the guidance of the tool 31 along the clamp 1 in its movement towards this tire.

In operation the jaws of the clamp engage the edge 8 of the rim, the clamp being substantially parallel to the axle of the wheel. The clamp is closed by means of the screw 17 and is supported with the aid of the crutch 24 whose end is brought to bear on the disc 25 of the rim.

It will be appreciated from FIG. 1 that as screw 17 is tightened it will bear more firmly on block 16, forcing levers 2 and 3 closer together on their right ends and clamping the jaws more tightly on the wheel rim. This will permit sliding block 27 to move down and to the left (as viewed in FIG. 1) thus moving side-pieces 20 to the left also, pivoting about axle 22.

Then the tool 31 of the jack 30, as represented by unbroken lines on FIG. 1, is forced to travel along lever 2 of the clamp under fluid pressure admitted into the jack 30. The tool 31 slides along the top of lever 2, comes into contact with the side of the tire 32 (position drawn in dotted lines in FIG. 1) then slides towards the rim 8, along the side of the tire 32, unseating the tire bead from the rim.

The reaction of the tool 31 is transmitted by the mounting 10 to the two levers of the clamp which strain to come together and are more tightly closed on the edge 8 of the rim as the resistance met by the tool 31 pushing against the tire 32 becomes greater. That is, as the tool 31 encounters more resistance, it tends to push side-piece 20 up and to the right (as viewed in FIG. 1) but this movement is resisted by sliding block 27 which is firmly engaged against the top of lever 3. Since the entire mechanism cannot pivot clockwise (due to crutch 24 engaging the wheel) the clockwise reaction force of tool 31 tends to pivot pieces 20 about axle 22 and sliding block 27 attempts to move lever 3 downward. Thus the reaction of tool 31 is transferred to the levers, tending to push them more tightly together, assisting screw 17.

It will be appreciated that modifications can be made to the device which has just been described, notably by substitution of equivalent mechanical parts, without thereby going beyond the scope of the present invention.

For example, the embodiment of the invention illustrated may be modified by transposing the positions of the pivotal connection and the sliding engagement of the mounting on the levers.

Alternatively the levers need not be crossed in a scissoring arrangement, as they are in the embodiment illustrated, the pivot being situated between the levers in such an alternative arrangement in which case the mounting is arranged to force the outer ends of the levers apart to tighten the grip of the clamp when the jack is operated.

Having now described the invention what is claimed is:

1. A device for unseating a tire bead from a wheel rim comprising:
    a. a clamp having a pair of levers for gripping the edge of the wheel rim;
    b. a jack having means to mount it on said clamp and carrying a tool for bearing on the tire;
    c. means to operably connect said jack mounting means to at least one of said levers so that when said tool bears against the tire, force from the jack is transferred through the mounting means to operate the levers, tightening the grip of the clamp on the wheel rim.

2. A device according to claim 1 in which the jack mounting means is pivotally connected to one of the levers and is provided with means to bear upon the other lever.

3. A device according to claim 1 in which the clamp surface is provided with a guide channel to engage and guide the tool along the clamp during displacement of the tool towards the tire.

4. A device according to claim 1 in which the jaws of the clamp are removable therefrom.

5. A device according to claim 1 including a crutch member for bearing on the wheel, said member being attached to a lever of the clamp to permit bracing of that lever against the wheel during operation of the jack.

6. A device according to claim 5 in which the crutch member is attached to said one lever to which the mounting of the jack is operably connected.

7. A device according to claim 1 in which the mounting of the jack comprises a pair of members braced together which are each pivotally attached at one end to one lever and at the other end to the jack, the members carrying intermediate their ends a bearing face positioned to bear on the other lever of the clamp.

8. A device according to claim 7 in which the bearing face is a face of a block mounted between said members.

* * * * *